United States Patent
Acocella et al.

(10) Patent No.: US 7,366,842 B1
(45) Date of Patent: Apr. 29, 2008

(54) CREATING PERMANENT STORAGE ON THE FLY WITHIN EXISTING BUFFERS

(75) Inventors: Dominic Acocella, Blainville (CA); Mark R. Goudy, Berkeley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 300 days.

(21) Appl. No.: 11/300,874

(22) Filed: Dec. 15, 2005

(51) Int. Cl.
*G06F 12/00* (2006.01)

(52) U.S. Cl. ............................ 711/118; 711/110

(58) Field of Classification Search ............... None
See application file for complete search history.

(56) References Cited

U.S. PATENT DOCUMENTS

| | | | |
|---|---|---|---|
| 5,696,985 A * | 12/1997 | Crump et al. ............... 712/36 |
| 6,532,531 B1 * | 3/2003 | O'Connor et al. .......... 712/202 |
| 6,539,467 B1 * | 3/2003 | Anderson et al. .......... 711/219 |
| 2005/0086437 A1 * | 4/2005 | Modha ....................... 711/133 |

* cited by examiner

*Primary Examiner*—T Nguyen
(74) *Attorney, Agent, or Firm*—Townsend and Townsend and Crew (57) ABSTRACT

A circular buffer having an active cache window can be configured to temporarily allocate one or more locations in the active cache as permanent memory locations to eliminate the possibility of overwriting the contents of the permanent memory locations. The cache window can be a subset of the entire circular buffer. If contents within the cache window are identified as persistent data, the locations corresponding to the persistent data can be identified as permanent memory locations. The position of the cache within the circular buffer can be frozen based on the permanent memory locations. A write mask can be used to maintain the contents of the permanent memory locations, while the remainder of the cache is configured as a temporary circular buffer. Operation of the cache returns to the entire circular buffer once the contents of the permanent memory locations no longer need to be maintained.

20 Claims, 6 Drawing Sheets

CREATING PERMANENT STORAGE ON THE FLY WITHIN EXISTING BUFFERS

BACKGROUND

Electronic data systems and electronic processing systems often utilize data buffers to temporarily store information. The information stored in a buffer is typically of a transient nature and is updated or otherwise consumed in short order.

An example of transient data that can be buffered is pixel data for a display image. A display image is typically updated on a periodic basis and the information for any particular pixel can be updated at the refresh rate of the display. Another example is processed data that is an intermediate result. By definition, intermediate results generated by a first process are used as inputs to a second process. The intermediate result data can be stored in a buffer and accessed by the second process. The intermediate results typically have a transient duration that is based on the ability of the second process to access and further process the intermediate results.

However, in some instances, a buffer may need to maintain certain contents for more than a transient period of time. Indeed, in some instances the buffer may need to store some of its contents for an arbitrarily long duration.

Long term content storage is contrary to the typical buffer implementation. A system configuration may rely on the buffer storing only transient contents that are quickly refreshed or otherwise consumed.

A system can allocate dedicated memory for permanent storage of buffer contents that need to be maintained for an arbitrarily long period of time. However, dedicating resources for storage of buffer contents is typically inefficient. The instances where buffer contents need to be stored indefinitely may be rare, but unpredictable. Thus, it is difficult to properly size the dedicated storage. Furthermore, the dedicated storage may seldom see use, and thus may present a wasteful allocation of resources.

BRIEF SUMMARY OF THE INVENTION

A circular buffer having an active cache window can be configured to temporarily allocate one or more locations in the active cache as permanent memory locations to eliminate the possibility of overwriting the contents of the permanent memory locations. The cache window can be a subset of the entire circular buffer. If contents within the cache window are identified as persistent data, the locations corresponding to the persistent data can be identified as permanent memory locations. The position of the cache within the circular buffer can be frozen based on the permanent memory locations. A write mask can be used to maintain the contents of the permanent memory locations, while the remainder of the cache is configured as a temporary circular buffer. Operation of the cache returns to the entire circular buffer once the contents of the permanent memory locations no longer need to be maintained.

Aspects of the invention include a method of dynamically allocating permanent memory, that includes defining a cache window having a plurality of memory locations, storing persistent data in at least one location in the cache window, masking the at least one location storing the persistent data, and operating the cache window as a circular buffer.

Aspects of the invention include a method of dynamically allocating permanent memory, that includes defining a moving cache window as a subset of a circular output buffer, writing persistent data to a location within the moving cache window, fixing the position of the moving cache window within the circular output buffer to generate a fixed cache window having at least one persistent memory location, write masking the at least one persistent memory location, and configuring the fixed cache window as a circular buffer.

Aspects of the invention include a system having dynamic allocation of permanent memory from existing buffer memory. The system includes a circular output buffer having a cache window, a core configured to generate and write data to the cache window, and a core interface configured to determine the presence of persistent data within the cache window, fix the position of the cache window in the circular output buffer in response to the presence of persistent data, and restrict write operations to the cache window having the fixed position.

Aspects of the invention include a system having dynamic allocation of permanent memory from existing buffer memory. The system includes means for storing content having a cache window defined therein, means for generating and writing content to the cache window, means for determining the presence of persistent data within the cache window, means for fixing the position of the cache window in the circular output buffer in response to the presence of persistent data, and means for controlling write operations to the cache window having the fixed position.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

A system and methods for dynamically allocating permanent storage from existing buffer space is disclosed herein. The system and methods allow buffer space to be dynamically allocated to permanent storage in the size and for the duration needed. The number of permanent storage locations is only limited by the size of the buffer. Yet no dedicated permanent storage needs to be allocated.

Figure 1:
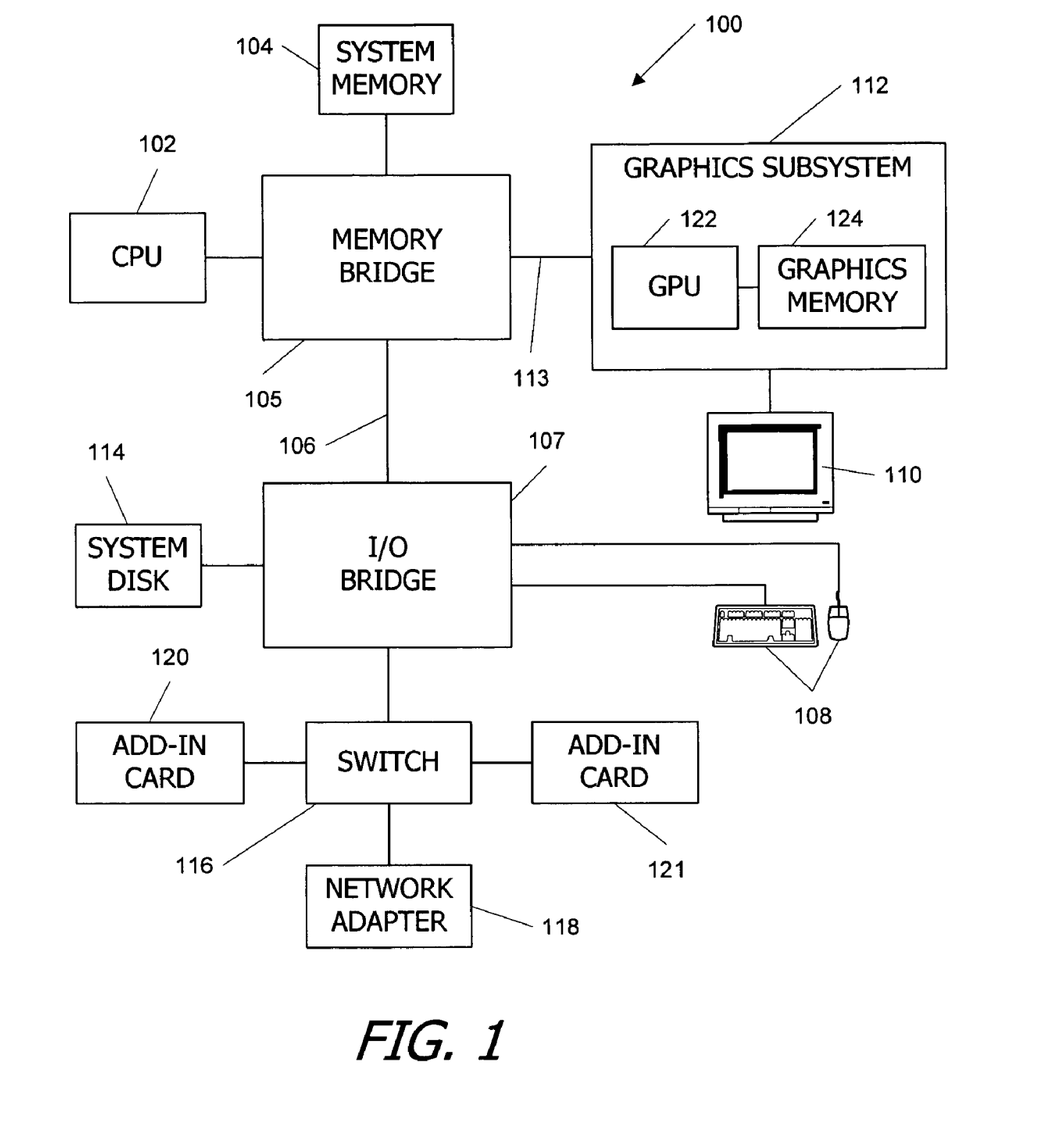
FIG. 1 is a simplified functional block diagram of an embodiment of a computer system.

FIG. 1 is a block diagram of a computer system 100 according to an embodiment of the invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 can also include a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107. A GPU may be provided with any amount of local graphics memory, including no local memory, and may use local memory and system memory in any combination. It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
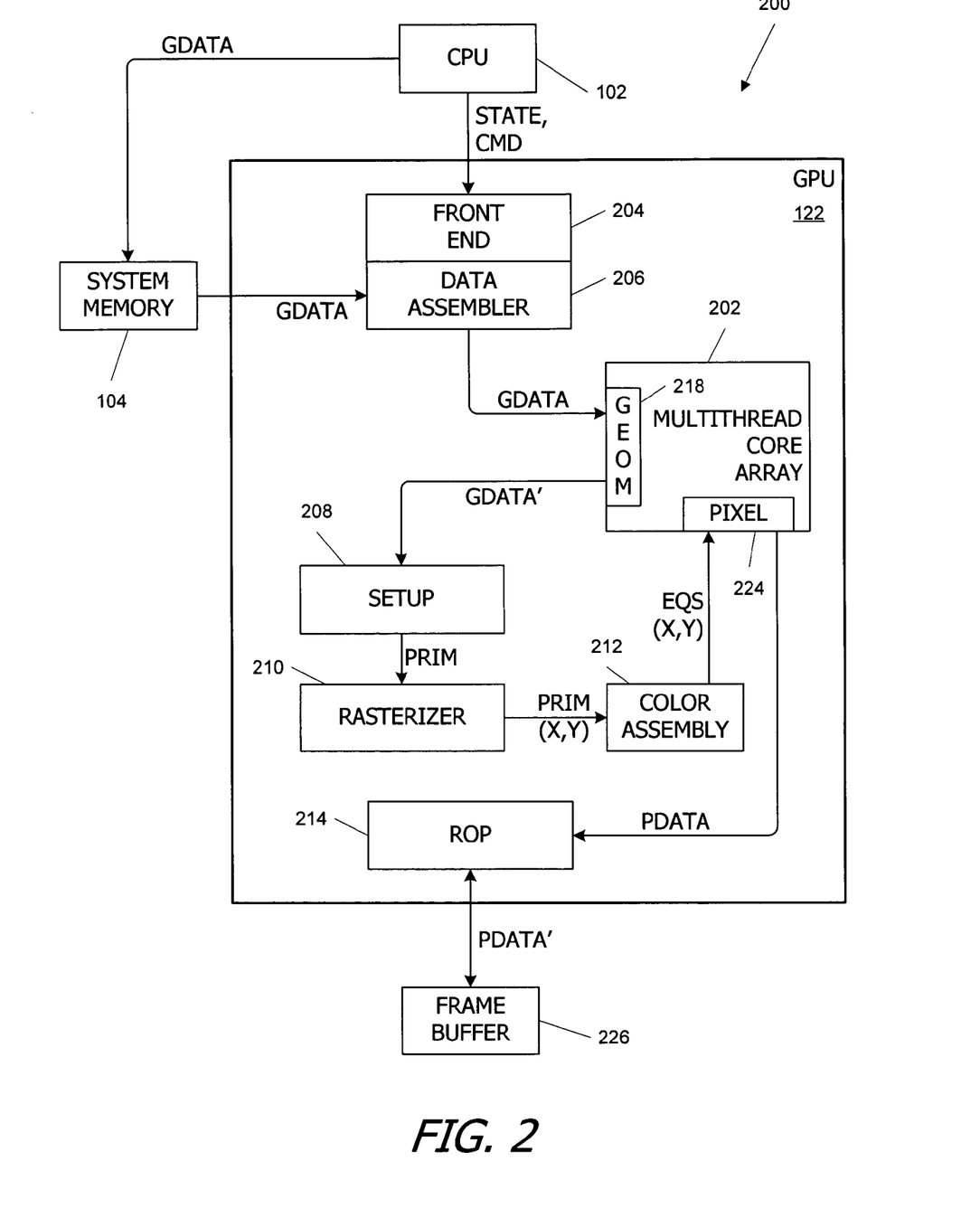
FIG. 2 is a simplified functional block diagram of a rendering pipeline.

FIG. 2 is a block diagram of a rendering pipeline 200 that can be implemented in GPU 122 of FIG. 1 according to an embodiment of the invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding embodiments of the invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a vertex shader program to interpolate a value for the attribute at any location within the primitive; conventional techniques can be used to generate the equations. For instance, in one embodiment, color assembly module 212 generates coefficients A, B, and C for a plane equation of the form $U=Ax+By+C$ for each attribute U.

Color assembly module 212 provides the attribute equations (EQS, which may include e.g., the plane-equation coefficients A, B and C) for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding embodiments of the invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

Multithreaded Core Array Configuration

Figure 3:
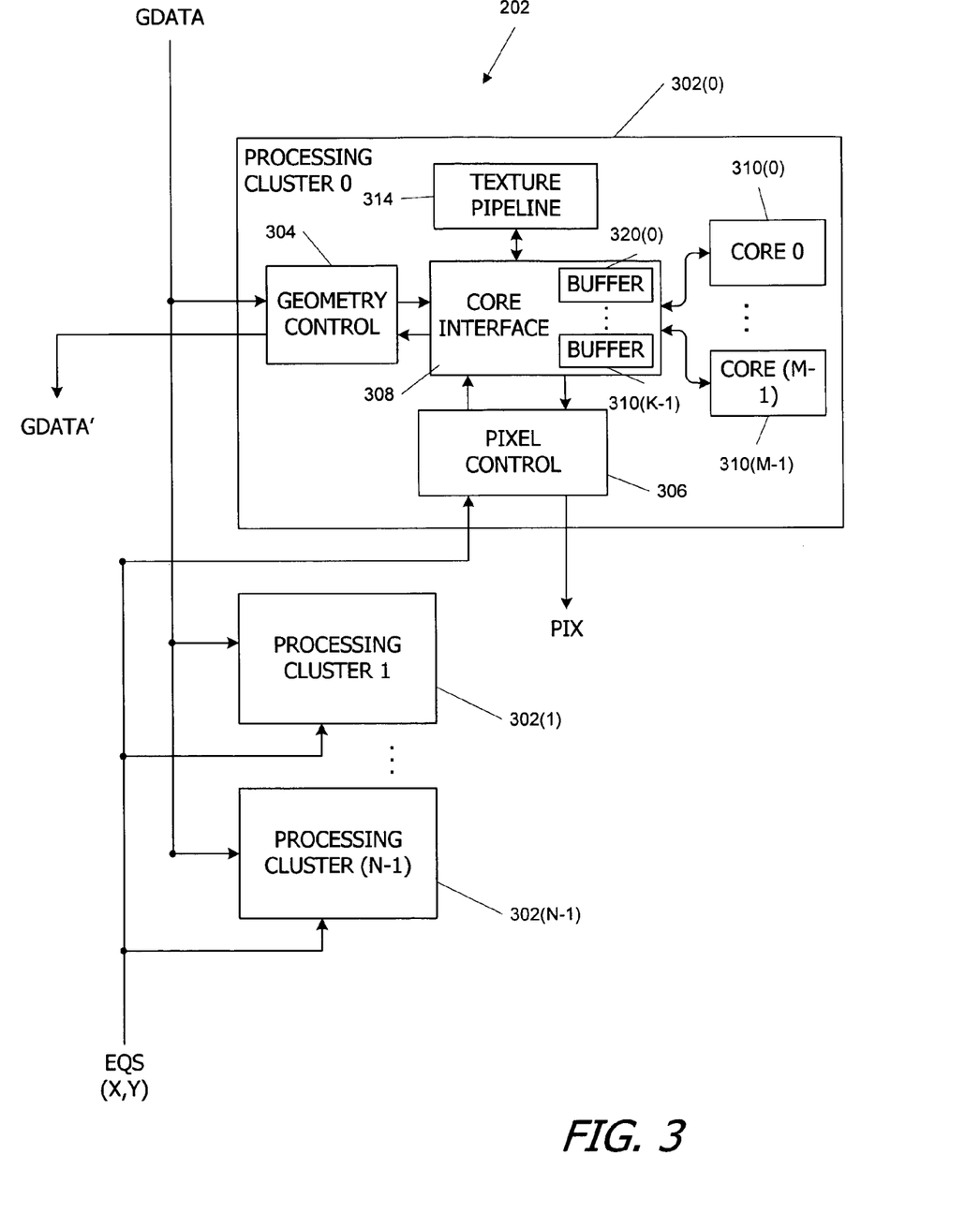
FIG. 3 is a simplified functional block diagram of a multithreaded core array.

In one embodiment, multithreaded core array 202 provides a highly parallel architecture that supports concurrent execution of a large number of instances of vertex, geometry, and/or pixel shader programs in various combinations.

FIG. 3 is a block diagram of multithreaded core array 202 according to an embodiment of the invention.

In this embodiment, multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4, 8 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads.

Core interface 308 also controls a texture pipeline 314 that is shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308. Texture processing by pipeline 314 may consume a significant number of clock cycles, and while a thread is waiting for the texture result, core 310 advantageously continues to execute other threads.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. The core 310 executing the vertex shader program writes the results to a buffer 320. The core 310 can also use one or more previously determined vertex shader results stored in the buffer in computing or otherwise determining subsequent vertex shader results. Upon completion of the vertex shader program, core interface 308 signals geometry controller 304. If a geometry shader program is to be executed, geometry controller 304 instructs core interface 308 to launch the geometry shader program. The core interface 308 can load vertex data to the core 310. The core 310 executes the appropriate geometry shader program and outputs the results in a buffer 320.

The buffer 320 can include multiple (K) buffers 320(0) through 320(K-1). Each buffer 320 can be associated with one or more cores 310. For example, the number (K) of buffers 320 can be equal to the number (M) of cores 310, and each core 310 can be associated with a particular buffer 320. In such an embodiment, core 310 can write its results to a particular buffer 320. In another embodiment, the number (K) of buffers 320 can be less than the number (M) of cores 310 and multiple cores 310 can share one or more buffers 320. In another embodiment, the number (K) of buffers 320 can be greater than the number (M) of cores 310, and each core 310 can be configured to write to one or more buffers 320.

In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GDATA') to setup module 208 of FIG. 2.

Each processing cluster 302 can be configured to any one of a plurality of configurations. The GPU 122 can reconfigure the processing cluster 302 depending on the processing requirements. For example, a first core 310(0) can be configured to operate as a vertex shader by executing a vertex shader program. The first core 310(0) can write its results to a first buffer 320(0). A second core 310(M−1) can be configured as a geometry shader by executing a geometry shader program. The second core 310(M−1) can retrieve the vertex data from the first buffer 320(0) and can write the geometry shader results to a second buffer 320(K−1). In such a configuration, the first buffer 320(0) can be configured to store intermediate vertex data results that are used as inputs to the geometry shader program executing on the second core 310(M−1).

In another example, the GPU 122 can configure the processing cluster 302 as exclusively a vertex shader, and each of the cores 310 can be configured to execute a vertex shader program. In such a configuration, the core interface 308 can load each of the cores 310 with vertex data and the cores 310 can be configured to execute vertex shader programs in parallel and write the results to corresponding buffers 320.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources or the location of the primitive in screen coordinates, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

The multithreaded core array described herein is illustrative and variations and modifications of the array are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 310(0) of each processing cluster. Such design choices may be driven by considerations of hardware size and complexity versus performance, as is known in the art. A shared texture pipeline is also optional; in some embodiments, each core might have its own texture pipeline or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it. In still another embodiment, processing clusters are selected based on properties of the input data, such as the screen coordinates of pixels to be processed.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Figure 4:
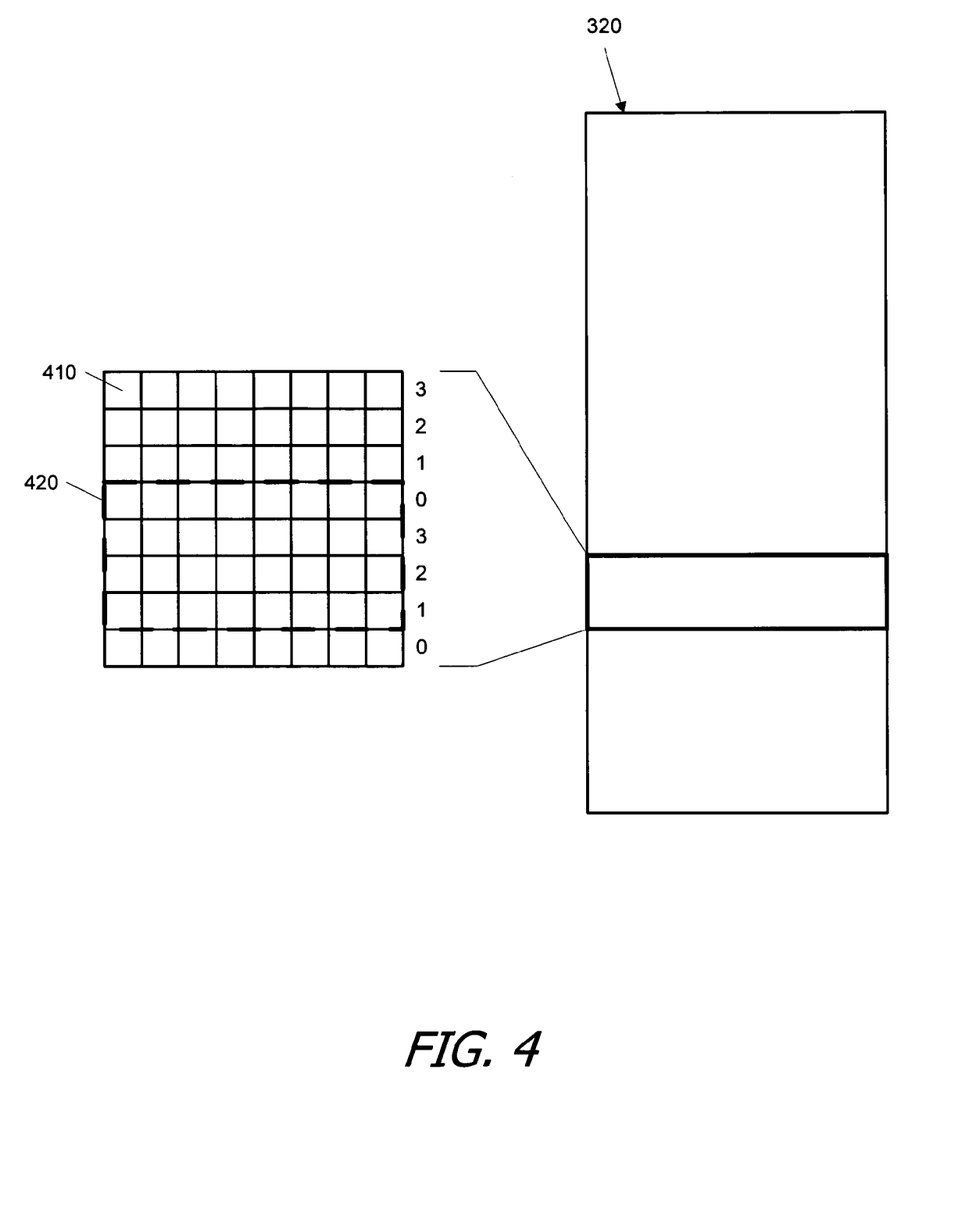
FIG. 4 is a simplified functional block diagram of a buffer.

FIG. 4 is a simplified functional block diagram of an embodiment of a buffer 320, such as a buffer used in the processing cluster shown in FIG. 3. Each buffer 320 can be configured as a circular buffer of predetermined size. In circular buffer, data can be written continuously to the buffer 320 in a cyclic manner. When the tail or end of the buffer 320 is reached, write operations loop back and resume at the head or beginning of the buffer 320. When the write location in the circular buffer wraps around from the tail to the head, the data overwrites contents previously stored in those locations. A circular buffer 320 can be advantageous when the data to be buffered is relatively dynamic and will be accessed or otherwise consumed by another process or device before the data is overwritten.

The size of the buffer 320 can be predetermined based on any number of factors. For example, the buffer 320 can be sized based on the worst case latency between write and subsequent read operations, such that data written to the circular buffer does not overwrite data that has yet to be read. The buffer 320 can also be sized based on the maximum number of data locations that may be accessed by a given process. For example, the buffer 320 can be sized based in part on a maximum number of vertices that will be accessed or otherwise referenced by a geometry shader.

The core interface 308 can define a cache window 420 within the circular buffer. The core interface 308 can be configured to dynamically determine and set the size of the cache window 420 based in part on the size of data to be processed by the core 310. Defining a cache window 420 that is too large can result in a performance degradation due to excessive time searching the cache window 420 for previously generated data. Alternatively, defining a cache window 420 size that is too small can result in the core 310 having to recompute values that were recently computed.

For example, the core interface 308 can be configured to determine a cache window 420 size that is based on a predetermined number of vertices that can be referenced by the cores when executing vertex or geometry shader programs. In one embodiment, the core interface 308 can be configured to define a cache window 420 that is capable of storing 32 vertices, shown in FIG. 4 as four rows of eight vertex locations. Although the buffer 320 is shown as a single buffer, and the cache window 420 is shown as a single window in the one buffer 320, the buffer 320 can include multiple buffers. Similarly, the cache window 420 can be distributed across multiple buffers. Additionally, the cache window 420 typically includes a subset of memory locations available in the buffer 320. However, in certain embodiments, the cache window 420 size can equal the buffer 320 size.

The actual size of the cache window 420, in terms of memory locations within the buffer 320, can vary depending on the size of each vertex. In one embodiment, each vertex can be defined using as few as one memory location and as many as sixteen memory locations. Thus, the size of the cache window 420 can vary by a factor of sixteen for the same number of vertices.

The core interface 308 can control the location that a write pointer references in the buffer 320. The core 310 writes vertex data to the buffer 320 in cache window 420 and at the location referenced by the write pointer. When the write pointer reaches the end of the cache window 420, the core interface 308 updates the position of the cache window 420 in the buffer 320. In one embodiment, the core interface 308 can assign memory corresponding to another row of eight vertices to the cache window 420 while removing memory corresponding to the oldest row of eight vertices from the cache window 420. In such an embodiment, the cache window 420 slides along the circular buffer 320. As the cache window fills, the core interface 308 makes another row available to the cache window 420 while removing the oldest row from the cache window 420.

The core 310 can be restricted to referencing data within the cache window 420. As described earlier, the cache window 420 size can be optimized to support the execution of the various vertex shader and geometry shader programs executed by the core 310. The core 310 unnecessarily consumes time searching the cache window 420 for previously generated data if the cache window 420 is too large, and the core 310 unnecessarily recomputes recently generated data if the cache window 420 is too small.

However, there can be instances in which the core 310 needs to store a data value for longer than the time it takes to completely fill the cache window 420. Such data can be referred to as "permanent data" or "persistent data" to indicate that the data needs to be accessible by the core 310 for greater than the time needed to completely fill the cache window 420.

If the cache window 420 is allowed to slide to another position in the buffer 320, the persistent data may no longer appear in the cache window 420 and may not be accessible by the core 310. Ordinarily, the core 310 would regenerate the persistent data. However, there may be instances in which the core 310 no longer has the information to recreate the data. For example, the information required by the core 310 to generate the persistent data may be transient and may no longer be available. For example, the data may have changed or been otherwise consumed by some other process.

As an example, a geometry shader may operate on a primitive that requires persistence of data for an anchor vertex. The anchor vertex data may designate the initial vertex of a closed polygon. Alternatively, in a fan triangle primitive, the anchor vertex can define an initial vertex of the fan, and may need to be referenced when generating the various triangles in the fan. The core 310 executing the geometry shader program may no longer have access to the data needed to recreate the anchor vertex. Thus, the core interface 308 needs to have the ability to create permanent memory as needed in order to allow persistent data to be accessible and not overwritten or otherwise made unavailable.

In one embodiment, the core interface 308 can identify the presence of persistent data and can identify the location of persistent data in the cache window 420. The core interface 308 can mark or otherwise identify as permanent memory, the location of the persistent data. Here, the term "permanent memory" and "persistent memory" refers to memory that is not overwritten or otherwise made unavailable for the duration that the persistent data needs to be stored.

The core interface 308 can also freeze the position of the cache window 420 in the buffer 320. The core interface 308 can be configured to freeze, fix, or otherwise make static the position of the cache window 420 such that the permanent memory, and thus the persistent data, remains in the cache window 420. The core interface 308 can fix the position of the cache window 420 when the persistent data is written to the cache window 420, just prior to the step that removes the memory location storing persistent data from the cache window 420, or some other time during which the persistent data is stored in the cache window 420.

The core interface 308 can operate the frozen cache window 420 as a circular buffer. The core interface 308 treats the frozen cache window 420 as if it were the complete buffer 320. The core interface 308 effectively shrinks the size of the buffer 320 to the size of the current cache window 420. The core 310 can continue to recycle the data in the cache window 420.

If the cache window 420 spans multiple buffers, the core interface 308 can be configured to fix the position of the cache window 420 across all of the buffers. Alternatively, the core interface 308 can be configured to freeze or otherwise fix the position of some of the cache window 420 portions. For example, the cache window 420 can be configured as a plurality of cache window 420 segments distributed across a plurality of buffers. The core interface can be configured to fix a subset of all the cache window segments. The core interface can fix, for example, the cache window segments storing the persistent data. The core interface 308 can allow the cache window segments in other buffers to continue to slide, cycle, or move, or otherwise remain dynamic across locations within that buffer.

The core interface 308 can also generate a write mask to ensure that the persistent data is not overwritten. As the write pointer circulates through the cache window 420, the write mask is applied to the write pointer to ensure that the write pointer does not refer to the permanent memory location.

In an alternative embodiment, the core interface 308 does not freeze the position of the cache window 420. Instead, the core interface 308 generates a write mask for the permanent memory locations. The core interface 308 creates an exception that allows the permanent memory to be referenced even though it may lie outside of the cache window 420. The core interface 308 can generate, for example, a table or other listing of the permanent memory locations. The listing of permanent memory locations can be used as the write mask. The core interface can maintain the list of permanent memory locations for as long as the persistent data is needed.

In still another embodiment, the core interface 308 can be configured to allow the cache window 420 to continue to slide within the buffer 320, but may rewrite the persistent data to the cache window 420 before the memory location storing the persistent data is released from the cache window 420. For example, before the row having the persistent data is removed from the cache window, the core interface 308 rewrites the persistent data to the cache window 420. The core interface 308 can continue to rewrite the persistent data to the cache window to maintain the data in memory that can be referenced by the core 310 for as long as the data is needed.

Although the previous embodiment discuss the generation and maintenance of permanent memory for a single instance of persistent data, the core interface 308 can treat multiple instances of persistent data the same way. Thus, the number of possible permanent memory locations can be dynamically created as needed by the shader programs executed by the core 310. The only limitation to the number of possible permanent memory locations is the size of the cache window 420 or the size of the buffer 320, depending on the embodiment.

Dynamically creating permanent memory is advantageous over allocating dedicated memory for storage of persistent data. By dynamically allocating permanent memory, the cost and size of dedicated memory can be eliminated. Additionally, the dedicated memory needs to be sized to handle the worst case condition for persistent data. It is likely that a large portion of the dedicated memory would never be used. If the instances of persistent memory are relatively rare, allocating dedicated memory for persistent data is largely a waste of resources.

Figure 5:
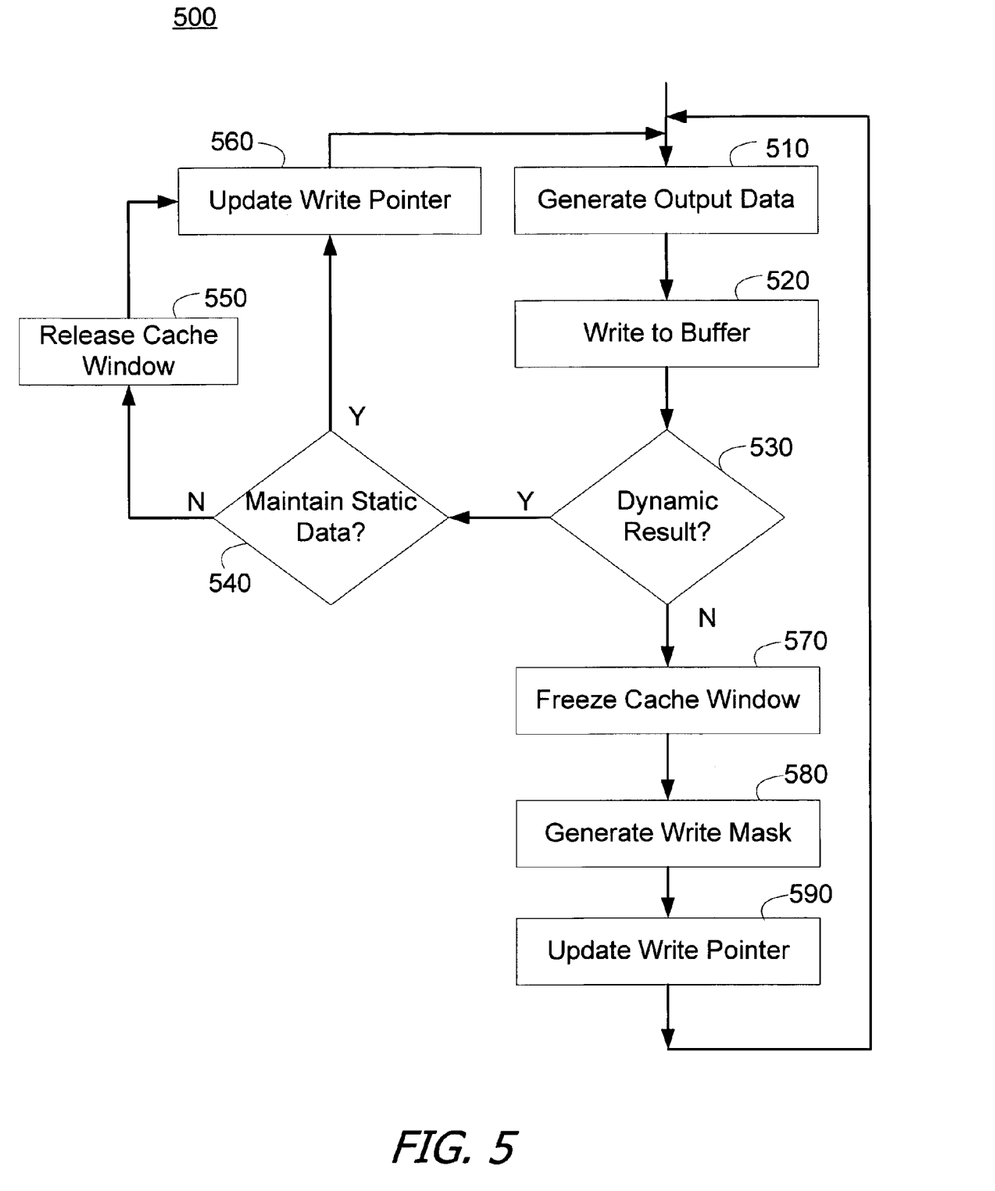
FIG. 5 is a simplified flowchart of a method of dynamically allocating permanent memory storage.

FIG. 5 is a simplified flowchart of an embodiment of a method 500 of dynamically allocating permanent memory storage. The method 500 can be performed, for example, by the processing cluster shown in FIG. 3 or the multithread core array shown in FIG. 2. The processing cluster can perform the described method 500 during the execution of a shader program, such as a vertex shader or geometry shader program. The method 500 is not limited to operating in the context of a graphics processor, and is not limited to operation within a processing cluster.

Alternative embodiments of the method 500 can omit one or more of the steps or may add one or more steps to the method 500. Additionally, the steps of the method 500 are generally shown in the logical order of operation, but some of the steps can be performed in an order different from that shown in FIG. 5.

The method 500 begins at block 510 when the core in the processing cluster generates output data that is to be written into a circular buffer. The embodiment of the method 500 assumes that the write buffer and cache window have been initialized. The circular buffer can be configured as the output buffer associated with the core. The core can execute a shader program, such as a geometry shader program, and can generate output data that is to be written into the cache window of the output buffer. The core can generate, for example, vertex data processed according to the shader program.

The processing cluster proceeds to block 520 and writes the output data to the buffer. In particular, the core writes the output data to the cache window location identified by the write pointer.

The processing cluster proceeds to decision block 530. At decision block 530, the processing cluster, for example via the core interface, determines whether the data written to the output buffer is dynamic data that can be overwritten or purged from the cache window. Alternatively, the processing cluster can determine if the output data is persistent data that needs to be stored and accessible for a period greater than the duration at which the data would normally be purged from the cache window.

If, at decision block 530, the processing cluster determines that the output data is not dynamic and that it represents persistent data, the processing cluster proceeds to block 570 and freezes, fixes, or otherwise makes static at least a portion of the cache window. As described earlier, if the cache window is distributed across multiple buffers, the processing cluster can choose to fix a subset of the cache window. The processing cluster can fix at least the portion of the cache window storing the persistent data.

The processing cluster proceeds to block 580 and generates or updates a write mask that includes the locations of all of the permanent memory locations within buffer memory. The processing cluster uses the write mask to ensure that the persistent data is not overwritten when the buffer cycles to the location of the persistent data.

After generating the write mask, the processing cluster proceeds to block 590 and updates the write pointer. The processing cluster can collapse the operation of the buffer into the portion represented by the cache window. Thus, the processing cluster updates the write pointer using the knowledge of the fixed cache window. After updating the write pointer, the processing cluster returns to block 510 to process the next output.

Returning to decision block 530, if the processing cluster determines that the output written to the output buffer is dynamic data, the processing cluster proceeds from decision block 530 to decision block 540. At decision block 540, the processing cluster determines whether the cache window presently stores persistent data. The processing cluster also determines whether persistent data needs to be maintained in the cache window. For example, the processing cluster may have completed processing of a primitive using persistent data, such that there is no longer any need to maintain the data as persistent. If at decision block 540, the processing cluster determines that there is no longer any need to maintain previously stored persistent data, or if the cache window contains no persistent data, the processing cluster proceeds to block 550 and releases the cache window. That is, if the processing cluster previously fixed the location of the cache window, the need to maintain the fixed position has passed, and the processing cluster can allow a moving cache window. The processing cluster proceeds to block 560 and updates the write pointer.

If, at decision block 540, the processing cluster determines that the cache window includes persistent data that needs to be maintained, the processing cluster allows the cache window to remain fixed. The processing cluster proceeds to block 560 and updates the write pointer with knowledge of the fixed position of the cache window and the presence of the wire mask.

Figure 6:
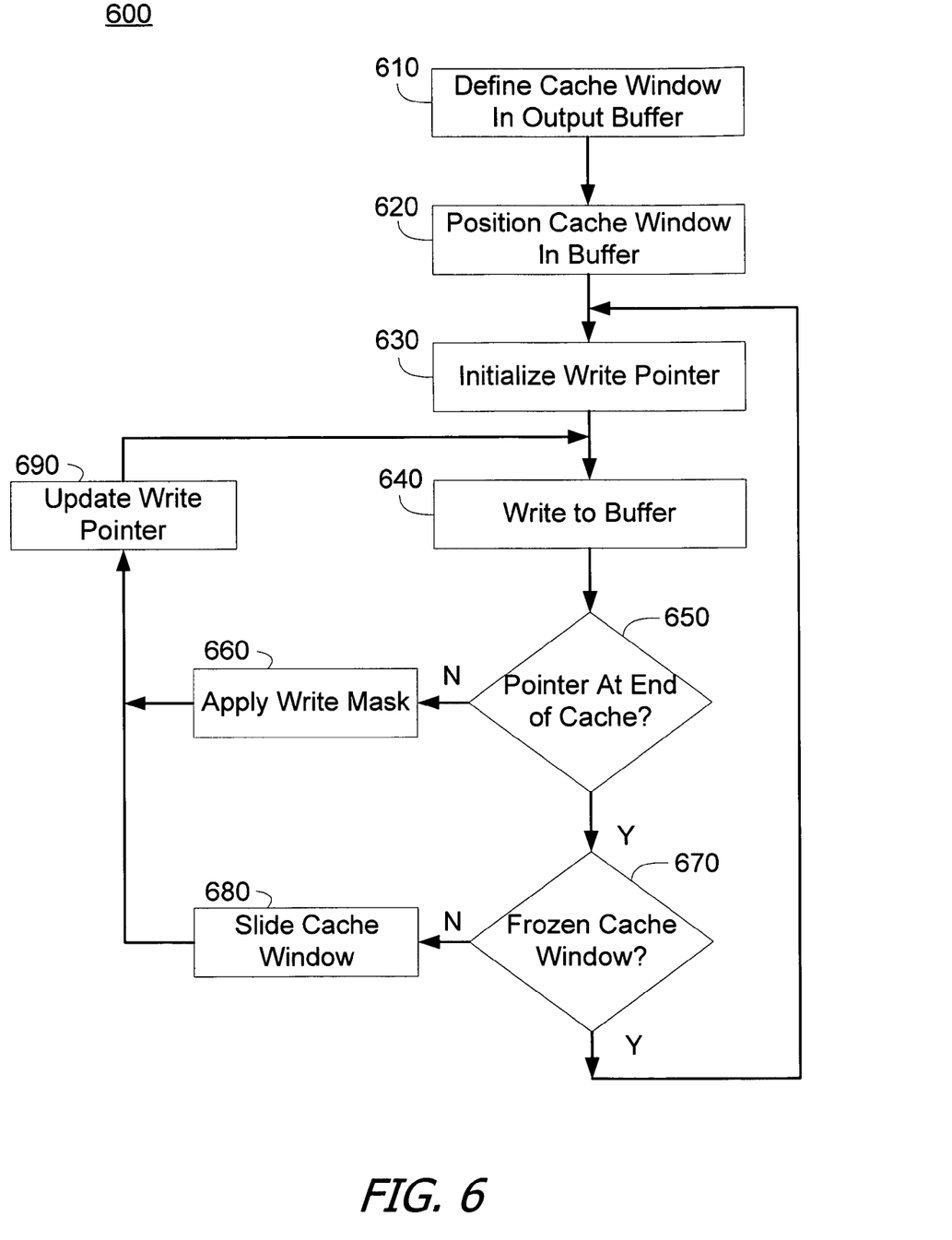
FIG. 6 is a simplified flowchart of a method of tracking cache memory having dynamically allocated permanent memory.

FIG. 6 is a simplified flowchart of an embodiment of a method 600 of tracking cache memory having dynamically allocated permanent memory. The method 600 can be performed by the processing cluster of FIG. 3 or the multithread core array shown in FIG. 2. For example, the processing cluster of FIG. 3 can perform the method 600 in conjunction with the method shown in FIG. 5.

The method 600 begins at block 610 where the processing cluster defines a cache window in an output buffer. As described earlier, the size of the cache window can vary depending on definitions in the shader programs executed by the cores. Thus, the processing cluster can take into account the shader program definitions when defining a cache window buffer size for one or more output buffers.

The processing cluster proceeds to block 620 and initially positions the cache window in the output buffer. Because the output buffer is typically configured as a circular buffer, the initial position of the cache window is not critical. The processing cluster proceeds to block 630 and initializes the write pointer based on the position of the cache window in the output buffer. The processing cluster can position the write pointer at the beginning, or head, of the cache window.

Once the memory and write pointer have been initialized, the processing cluster proceeds to block 640 and waits for a write to the buffer at the position of the write pointer. After the write, the processing cluster proceeds to decision block 650 to determine if the write pointer is positioned at the end of the cache window.

If the write pointer is not at the end of the cache window, the cache window has more available space that can be used before determining whether to move the cache window or recycle cache window locations. If the write pointer is not at the end of the cache window, the processing cluster proceeds to block 660 and apply the write mask to the write pointer. A write mask having masked locations can exist if the processing cluster has allocated one or more cache window locations as permanent memory. The processing cluster can apply the write mask, for example, by determining whether the write mask has masked the next location in the write cache.

After applying the write mask, if any, the processing cluster proceeds to block 690 and updates the location referenced by the write pointer. The processing cluster can, for example, increment the write pointer by one memory location or increment the write pointer past masked memory locations. After updating the write pointer, the processing cluster returns to block 640 to await the next write to the output buffer.

Returning to decision block 650, if the processing cluster determines that the write pointer is at the end of the write cache, the processing cluster proceeds to decision block 670. At decision block 670, the processing cluster determines whether the cache window is frozen or fixed, for example, due to the presence of persistent data that needs to be maintained.

If the cache window is frozen, the processing cluster proceeds back to block 630 to reinitialize the write pointer to the head of the cache window, taking into account any write mask that may be present. The processing cluster logically collapses the output buffer to the size of the cache window when the cache window is frozen. In the fixed mode, the write cache operates as a circular buffer. Thus, after the end of the cache window is written, the write pointer returns to the head of the cache window, or if that location is masked, to the earliest non-masked memory location.

Returning to decision block 670, if the processing cluster determines that the cache window is not frozen, such as when there is no persistent data stored in the cache window, the processing cluster proceeds to block 680. At block 680, the processing cluster slides or otherwise moves the position of the cache window relative to the buffer. For example, the processing cluster can be configured to add a predetermined block of memory to the cache window and release a block of the same size from the cache window. In one example, the processing cluster can add a memory block equal to the size of eight vertices to the cache window and can release a memory block equal to the size of the eight oldest vertices in the cache window. Because the vertex size may have changed since the oldest vertices were generated, the actual size of the cache window may not remain the same.

After updating the position and size of the cache window, the processing cluster proceeds to block 690 and updates the position of the write pointer. The processing cluster can increment the write pointer to reference the next available memory location. If the write pointer was previously positioned at the tail of the buffer, the processing cluster is cycled back to the head of the buffer to recycle the circular buffer.

A system and methods for creating permanent storage on the fly within existing buffers have been described. In normal operation, one or more output buffers can be configured as circular buffers in which the memory locations are recycled. Old contents within the circular buffers are replaced by new contents when the write position returns to the previously populated memory location.

However, in some circumstances it is desirable to preserve old contents for an arbitrarily long time, and at least for a period of time that the contents remain available in a cache. The contents can be maintained indefinitely by shrinking or otherwise collapsing the size of the circular buffer to the size of the cache window.

Operation continues using the memory locations within the cache window as the output circular buffer. The contents of one or more memory locations within the cache window can be maintained for an arbitrarily long time by masking the output writes to the locations. The masked locations effectively become permanent memory locations for the stored contents.

Additional permanent memory space can be defined by adding more locations that are write masked, while locations can be released from permanent memory by deleting the locations from the write mask. Thus, an arbitrary number of permanent memory locations can be defined, up to the entire size of the output buffer, without allocating any dedicated permanent memory.

The various illustrative logical blocks, modules, and circuits described in connection with the embodiments disclosed herein may be implemented or performed with a general purpose processor, a graphics processing unit, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of dynamically allocating permanent memory, the method comprising:
    defining a cache window having a plurality of memory locations;
    storing persistent data in at least one location in the cache window;
    masking the at least one location storing the persistent data; and
    operating the cache window as a circular buffer.

2. The method of claim 1, wherein defining the cache window comprises defining the cache window within a buffer having a number of memory locations, the number greater than the plurality of memory locations within the cache window.

3. The method of claim 1, wherein defining the cache window comprises allocating a subset of an output circular buffer to the cache memory.

4. The method of claim 1, wherein defining the cache window comprises allocating a portion of each of a plurality of output circular buffers to the cache window.

5. The method of claim 1, wherein storing persistent data comprises:
    writing data to a location within the cache window; and
    identifying the data as persistent data.

6. The method of claim 1, wherein masking the at least one location storing the persistent data comprises generating a write mask corresponding to the at least one location.

7. The method of claim 1, wherein operating the cache window as the circular buffer comprises:
    fixing the position of the cache window in a buffer having greater than the plurality of memory locations within the cache window; and
    recycling the plurality of memory locations within the cache window exclusive of the at least one location storing the persistent data.

8. A method of dynamically allocating permanent memory, the method comprising:
    defining a moving cache window as a subset of a circular output buffer;
    writing persistent data to a location within the moving cache window;
    fixing the position of the moving cache window within the circular output buffer to generate a fixed cache window having at least one persistent memory location;
    write masking the at least one persistent memory location; and
    configuring the fixed cache window as a circular buffer.

9. The method of claim 8, wherein defining the moving cache window comprises defining a segment of the moving cache window in each of a plurality of buffers from the circular output buffer.

10. The method of claim 8, wherein fixing the position of the moving cache window comprises fixing a position of a segment of the moving cache window having the at least one persistent memory location.

11. The method of claim 8, further comprising restoring the fixed cache window to the moving cache window when the persistent data is no longer desired.

12. The method of claim 8, further comprising removing the at least one persistent memory location from a write mask after the persistent data within the at least one persistent memory location is no longer desired.

13. The method of claim 12, further comprising restoring the fixed cache window to the moving cache window when the persistent data is no longer desired.

14. A system having dynamic allocation of permanent memory from existing buffer memory, the system comprising:
    a circular output buffer having a cache window defined therein;
    a core configured to generate and write data to the cache window; and
    a core interface configured to determine the presence of persistent data within the cache window, fix the position of the cache window in the circular output buffer in response to the presence of persistent data, and restrict write operations to the cache window having the fixed position.

15. The system of claim 14, wherein the core interface is further configured to operate the cache window in the fixed position as a circular buffer.

16. The system of claim 14, wherein the core interface is further configured to generate a write mask of one or more memory locations within the cache window storing the persistent data.

17. The system of claim 16, wherein the core interface is further configured to remove at least one memory location from the write mask if the persistent data stored in the at the at least one memory location is no longer desired.

18. A system having dynamic allocation of permanent memory from existing buffer memory, the system comprising:
    means for storing content having a cache window defined therein;
    means for generating and writing content to the cache window;
    means for determining the presence of persistent data within the cache window;
    means for fixing the position of the cache window in the circular output buffer in response to the presence of persistent data; and
    means for controlling write operations to the cache window having the fixed position.

19. The system of claim 18, wherein the means for storing content comprises a circular output buffer.

20. The system of claim 18, wherein the means for controlling write operations to the cache window comprises a core interface having a write pointer masked by a write mask of persistent content locations within the cache window.

* * * * *